United States Patent [19]

Yeung

[11] Patent Number: 5,282,976

[45] Date of Patent: Feb. 1, 1994

[54] TERPOLYMER USEFUL AS A SCALE INHIBITOR

[75] Inventor: Dominic W.-K. Yeung, Mississauga, Canada

[73] Assignee: Rhone-Poulenc Inc., Cranbury, N.J.

[21] Appl. No.: 918,714

[22] Filed: Jul. 21, 1992

[51] Int. Cl.$^5$ .............................................. C02F 5/14
[52] U.S. Cl. ...................... 210/697; 210/698; 210/699; 210/701; 252/180; 252/181; 422/15; 422/17
[58] Field of Search .................. 210/696–701; 252/180, 181; 422/15, 17

[56] References Cited

U.S. PATENT DOCUMENTS

| | | | |
|---|---|---|---|
| 3,463,730 | 8/1969 | Booth et al. | 210/58 |
| 3,709,815 | 1/1973 | Boothe et al. | 210/58 |
| 3,806,367 | 4/1974 | Lange et al. | 134/3 |
| 3,928,196 | 12/1975 | Persinski et al. | 210/58 |
| 4,469,615 | 9/1984 | Tsuroka et al. | 252/180 |
| 4,500,693 | 2/1985 | Takehara et al. | 526/240 |
| 4,532,048 | 7/1985 | Amjad et al. | 210/701 |
| 4,552,665 | 11/1985 | Ralston et al. | 210/58 |
| 4,560,481 | 12/1985 | Hollander | 210/697 |
| 4,566,973 | 1/1986 | Masler, III et al. | 210/701 |
| 4,604,211 | 8/1986 | Kneller et al. | 210/701 |
| 4,659,481 | 4/1987 | Chen | 210/697 |
| 4,659,482 | 4/1987 | Chen | 210/699 |
| 4,671,880 | 6/1987 | Wisener et al. | 210/699 |
| 4,711,725 | 12/1987 | Amick et al. | 210/701 |
| 4,717,499 | 1/1988 | Chen | 252/181 |
| 4,732,698 | 3/1988 | Chen | 252/181 |
| 4,931,188 | 6/1990 | Chen | 210/697 |
| 4,944,885 | 7/1990 | Chen | 210/701 |
| 4,952,326 | 8/1990 | Amjad et al. | 210/701 |
| 4,963,267 | 10/1990 | Hoots et al. | 210/701 |

FOREIGN PATENT DOCUMENTS 0271035  6/1988  European Pat. Off. .
8302607  8/1983  PCT Int'l Appl. .

OTHER PUBLICATIONS

Imai et al, "a Newly Developed Polymer to Inhibit Scale in Cooling Water Systems", Materials Performance, pp. 41–44, May 1989.

*Primary Examiner*—Peter Hruskoci

[57] ABSTRACT

A novel terpolymer particularly useful as a scale inhibitor for aqueous systems is provided. The terpolymer preferably is derived from monomers of acrylic or methacrylic acid, vinyl acetate and/or vinyl alcohol, and sodium-1-allyloxy-2-hydroxypropyl sulfonate.

11 Claims, No Drawings

TERPOLYMER USEFUL AS A SCALE INHIBITOR

BACKGROUND OF THE INVENTION

1. Field of the Invention

The present invention relates to a novel terpolymer useful for inhibiting the formation of scale in water systems. More specifically, the terpolymer comprises monomers of acrylic or methacrylic acid, vinyl acetate and/or vinyl alcohol formed by hydrolysis of vinyl acetate, and sodium-1-allyloxy-2-hydroxypropyl sulfonate. These novel terpolymers are particularly effective in inhibiting the formation of inorganic scales derived from sparingly soluble salts of calcium, barium, magnesium, and the like. 2. Technology Description Many industrial applications and residential areas utilize water containing relatively high concentrations of inorganic salts. These salts are formed by the reaction of metal cations, such as calcium, magnesium, or barium, with inorganic anions such as phosphate, carbonate and sulfate. These salts have low solubilities in water and as their concentration in solution increases, or as the pH or temperature of the water containing them increases, these salts tend to precipitate from solution, crystallize and form hard deposits or scale on surfaces. Scale formation is a problem in heat transfer devices, boilers, secondary oil recovery wells and on clothes washed with such hard waters.

Many cooling water systems, including industrial cooling towers and heat exchangers made from carbon steel experience corrosion problems caused by the presence of dissolved oxygen. Corrosion is combated by the addition of various inhibitors such as orthophosphate compounds and/or zinc compounds. The addition of phosphates, however, adds to the formation of highly insoluble phosphate salts such as calcium phosphate. Other inorganic particulates, such as mud, silt and clay, are commonly found in cooling water. These particulates tend to settle onto surfaces and thereby restrict water flow and heat transfer unless they are effectively dispersed.

The stabilization of aqueous systems containing scale forming salts and inorganic particulates involves one or a combination of mechanisms. Anti-precipitation involves the delay of precipitation by limiting the size of the salts to sub-colloidal dimensions possibly by adsorption of the inhibitor onto the salt crystal soon after nucleation, thereby interfering with further crystal growth. Dispersion of the precipitated salt crystals is another stabilization mechanism believed to be the result of the adsorption of the inhibitor onto precipitated crystals, thereby imparting an electronegative charge which retards agglomeration, settling and deposition on surfaces by repulsive forces. The adsorption of the inhibitor can also be used to stabilize the system by facilitating the dispersion and subsequent removal of other suspended particulates, such as mud silt and clay, and metals such as iron and zinc and their insoluble salts, from aqueous systems. Another stabilization mechanism involves the ability of the inhibitor to interfere with and distort the crystal structure of the scale making the scale more easily fracturable and dispersible.

A large number of compositions have been proposed for use as scale inhibitors. Most of these compositions comprise water soluble monomers and polymers. For example, U.S. Pat. No. 3,463,730 teaches the use of an acrylic acid/acrylamide copolymer useful as a scale inhibitor. U.S. Pat. Nos. 3,709,815; 3,928,196 and 4,552,665 and WO 83/02607 suggest that a copolymer including monomer units of 2-acrylamido-2-substituted propane-1-sulfonic acid or acid salts (abbreviated "AMPS") be used as a scale inhibitor. The references suggest that in a preferred embodiment, AMPS be copolymerized with ethylenically unsaturated momoners such as acrylic acid or methacrylic acid.

U.S. Pat. No. 3,806,367 further suggests that AMPS be used as a comonomer in a polymeric composition used to inhibit the formation of scales. Examples of comonomers suggested in the patent include acrylic and methacrylic acids, acid salts and esters; substituted and nonsubstituted acrylamides; vinyl compounds and esters; and the like. The reference also suggests that a terpolymer using AMPS and two of the monomers selected from the above listing be employed. WO 83/02607 suggests that the copolymers may contain minor amounts of (up to 5 mole percent) other monomeric units which are substantially inert with respect to the production of the copolymers. Suggested units are lower esters of acrylic or methacrylic acid, acrylonitrile and the like.

U.S. Pat. No. 4,469,615 teaches a water treating composition including a copolymer which is an addition reaction product of a glycidyl ether or glycidyl ester and an α,β-ethylenically unsaturated carboxylic acid and another vinyl monomer other than the addition reaction product monomer.

U.S. Pat. No. 4,566,973 teaches the use of a copolymer of acrylic acid with a substituted acrylamide to inhibit the formation of phosphate scale in water systems. Preferred acrylamides suggested include diacetoneacrylamide, N-t-butylacrylamide and N,N-dimethylacrylamide.

U.S. Pat. No. 4,532,048 suggests the use of a terpolymer in method for inhibiting scale formation. The terpolymer includes monomer units of (i) acrylic or methacrylic acid; (ii) a lower alkenyl carboxylate; and (iii) a salt of a lower alkenyl sulfonate. A preferred terpolymer includes monomers of acrylic acid, vinyl acetate and sodium vinyl sulfonate. The terpolymer is claimed to be particularly effective against calcium phosphate, zinc phosphate and magnesium phosphate. U.S. Pat. No. 4,604,211 also suggests that this preferred terpolymer be used as a dispersant for industrial water systems.

A series of patents assigned to Betz Laboratories of Trevose, Pa., teach the use of a specific polymer for water treatment. These include U.S. Pat. Nos. 4,560,481; 4,659,481; 4,659,482; 4,671,880; 4,717,499; 4,732,698; 4,931,188; and 4,944,885. The polymer includes monomeric units of, preferably, acrylic or methacrylic acid, an ester thereof or an amide thereof along with an allyl ether monomer containing a metal salt. The preferred allyl ether monomer described is 1-propane sulfonic acid, 2-hydroxy-3-(2-propenyloxy)-mono sodium salt (therein called "AHPSE"). U.S. Pat. Nos. 4,659,481; 4,659,482; 4,717,499; 4,732,698; and 4,944,885 suggest that AHPSE monomers may be incorporated into a water soluble terpolymer backbone having other repeat units including acrylic acid monomers, alkyl acrylate monomers, methacrylic acid monomers and acrylamide monomers. Despite this suggestion, no examples of such terpolymers are enabled in the patents. U.S. Pat. No. 4,931,188 suggests that a terpolymer be formed using the above mentioned monomers along with an additional monomer such as ethylene, styrene or alkylvinyl phosphonic acid. Despite this suggestion, no examples of such terpolymers are enabled in the patent.

A discussion of the results obtained when using an acrylic acid/AHPSE copolymer is presented in the article entitled "A Newly Developed Polymer to Inhibit Scale in Cooling Water Systems", authored by Imai and Uchida (Materials Performance, May 1989, pp. 41-44).

U.S. Pat. No. 4,500,693 discloses copolymers useful as scale inhibitors and pigment dispersants. The copolymer is made up of monomeric units including 50 to 99.5 mol percent of at least one (meth)acrylic acid-based monomer and 0.5 to 50 mol percent of at least one allyl ether-based monomer. One such set of monomers disclosed is 3-allyloxy-2-hydroxypropane-1-sulfonic acid and alkali metal salts thereof.

EPO 0 271 035 discloses the treatment of aqueous systems by using a polymer including at least one of each of the following monomers: (a) a monounsaturated carboxylic acid, including salts and anhydrides thereof, the acid having 3 to 5 carbon atoms; (b) an acrylamidoalkane sulfonic acid and salts thereof, such as AMPS; and (c) a primary copolymerizable monomer selected from one of a number of groups. One such group of monomers disclosed for monomer (c) is allyloxy hydroxyalkane sulfonic acids and salts thereof. Despite this disclosure, no examples utilizing these monomers is presented.

U.S. Pat. No. 4,711,725 discloses a terpolymer or interpolymer useful for treating aqueous systems. The compositions are derived from at least the following three types of monomers: (a) (meth)acrylic acids and salts; (b) acrylamido alkyl or aryl sulfonates; and (c) at least one unit derived form certain vinyl esters, vinyl acetates and substituted acrylamides. The most preferred terpolymer of these compounds includes 57% by weight (meth)acrylic acid or salt units, 23% by weight AMPS and 20% by weight of a vinyl ester, vinyl acetate or alkyl substituted acrylamide.

U.S. Pat. No. 4,963,267 discloses compositions useful for reducing and stabilizing manganese deposits. The compositions are water-soluble polymers having a pendant functionality including an amide linkage. The patent further suggests that these amide-linkage containing polymers can be copolymerized with units which are preferably substantially carboxylate-containing units and unsubstituted pendant amide-containing units. In still another use, the polymers can be used in combination with acrylamide units and acrylic acid units to form a terpolymer.

Despite these above compositions, there still exists a need for compositions which are cost effective to produce and can function as superior antiscalants against several types of inorganic scales such as calcium carbonate, calcium sulfate, calcium phosphate, barium sulfate, magnesium scales and the like.

BRIEF SUMMARY OF THE INVENTION

In accordance with the present invention, a novel class of terpolymers is provided. The terpolymers primarily function as an multifunctional antiscalant, but have other uses such as dispersants for metallic oxides such as FeO and TiO$_2$. The terpolymers are easily synthesized, can be used in minute amounts, and are believed to be environmentally safe (they are non toxic and possess a degree of biodegradability).

One embodiment of the present invention comprises a terpolymer containing 50 to 90 mole percent of repeating unit (I); 1 to 30 mole percent of repeating unit (II); and 1 to 30 mole percent of repeating unit (III).

where $R_1$ is H or CH$_3$;

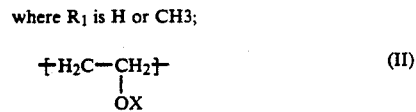

where X is COCH$_3$ or H;

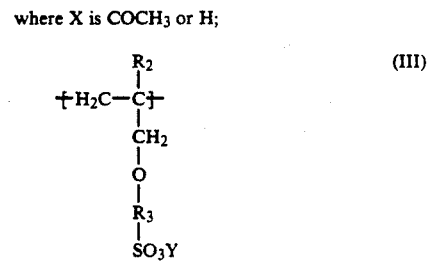

where $R_2$ is H or a $C_1$-$C_3$ alkyl group; $R_3$ is a hydroxysubstituted alkylene radical having from 1 to 6 carbon atoms; and Y is H or a water soluble metal cation.

In a particularly preferred embodiment, repeating unit (I) is derived from acrylic acid, repeating unit (II) is derived from vinyl acetate (including vinyl alcohol which has been formed by hydrolysis of vinyl acetate) and repeating unit (III) is derived from sodium-1-allyloxy-2-hydroxypropyl sulfonate (AHPSE).

Still another embodiment of the present invention comprises adding an effective amount of the above terpolymer to an aqueous system to reduce the formation of inorganic scales in the aqueous system.

Accordingly, it is a primary object of the present invention to provide a novel terpolymer which is particularly effective as an antiscalant.

It is another object of the present invention to provide a method for reducing the amount of inorganic scales formed in an aqueous system.

These, as other objects, will readily be apparent to those skilled in the art as reference is made to the detailed description of the preferred embodiment.

DETAILED DESCRIPTION OF THE PREFERRED EMBODIMENT

In describing the preferred embodiment, certain terminology will be utilized for the sake of clarity. Such terminology is intended to encompass the recited embodiment, as well as all technical equivalents which operate in a similar manner for a similar purpose to achieve a similar result.

The Novel Terpolymer

The present invention provides a novel terpolymer containing 50 to 90 mole percent repeating unit (I) where $R_1$ is H or CH$_3$; 1 to 30 mole percent repeating unit (II) where X is COCH$_3$ or H; and 1 to 30 mole percent repeating unit (III) where $R_2$ is H or a $C_1$-$C_3$ alkyl group; $R_3$ is a hydroxysubstituted alkylene radical having from 1 to 6 carbon atoms; and Y is H or a water soluble metal cation.

The above described terpolymers are water soluble, have a preferred molecular weight ranging from about 10,000 to about 40,000 daltons using a size chromatography (high pressure liquid chromatograph equipped with size exclusion columns and refractive index detector) method, with a range of 15,000 to 25,000 being especially preferred.

In the preferred embodiment, repeating unit (I) is derived from acrylic acid or methacrylic acid. Particularly preferred is the use of acrylic acid. Acrylic acid is well known and may be produced by hydrolysis of acrylonitrile or via oxidation of acrolein. Acrylic acid is also commercially available.

Repeating unit (II) is derived from vinyl acetate or vinyl alcohol which is produced as the hydrolysis product of vinyl acetate. This material is well known and commercially available. In practice of the present invention, unit (II) may include both vinyl acetate moieties and vinyl alcohol moities.

Repeating unit (III) is preferably an allyl hydroxy propyl sulfonate ether monomer ("APHSE"). This monomer is prepared via a ring opening reaction of the epoxy group of an allyl glycidyl ether precursor. Sulfonation of the epoxy group with sodium sulfite in the presence of a phase transfer catalyst such as tetra-n-butylammonium bisulfite or with fuming sulfuric acid containing sulfur trioxide will produce the sulfonic acid group and hydroxy group of the AHPSE. The resulting monomer can be further neutralized with any basic material such as NaOH. This material is commercially available from Rhône-Poulenc Inc. and sold under the name Sipomer COPS-1.

In a particularly preferred embodiment, unit (I) is derived from acrylic acid, unit (II) is derived from vinyl acetate and/or vinyl alcohol, and unit (III) is derived from 1-propane sulfonic acid, 2-hydroxy-3-(2-propenyloxy)-mono sodium salt. Terpolymers yielding particularly good results as antiscalants contain the following mole ratios of (I)/(II)/(III) (50% solids level): 80/15/5, 87.5/6.25/6.25, 80/6.7/13.3, 70.5/11.7/17.6, 73.6/15.8/10.5, 84.2/5.3/10.5, with the 80/15/5 terpolymer being particularly preferred.

Synthesis of the Terpolymers

Synthesis of polymers including copolymers and terpolymers of (meth)acrylic acid are set forth in U.S. Pat. Nos. 4,314,004; 4,301,266; 3,646,099; and 4,711,725. To the extent necessary for complete disclosure of such polymerization methods, these patents are hereby incorporated by reference.

In a preferred method, the novel terpolymers are synthesized by metering respective amounts of the unsaturated monomers corresponding to units (I) and (II) and a polymerization initiator into a reactor vessel which contains an amount of the unsaturated monomer corresponding to unit (III), a chain transfer agent, and a reaction solvent, preferably water at a temperature ranging from about 65° C. to about 90° C., and thereby allowing the monomers to react.

The initiator is preferably a free radical initiator. Suitable initiators include persulfate initiators such as sodium persulfate, potassium persulfate, ammonium persulfate, peroxide initiators such as hydrogen peroxide and t-butyl peroxide, azo compounds, perester compounds and common redox initiator (cationic and anionic) systems. In practice the amount of initiator used is between about 1 and about 5 parts per 100 parts of combined units (I), (II) and (III). In a preferred embodiment, sodium persulfate is the initiator of choice.

The chain transfer agent functions to regulate the molecular weight of the terpolymer to the desired range. Examples of suitable chain transfer agents include alcohols such as isopropyl alcohol, hydroxyacetic acid, mercaptans and metal salts such as cupric chloride, cuprous chloride, cupric bromide, cuprous bromide, cupric sulfate, cupric acetate, ferric chloride, ferrous chloride, ferrous sulfate, ferric phosphate and ferrous phosphate.

In the preferred embodiment, isopropyl alcohol is used as the chain transfer agent. When isopropyl alcohol is selected as the chain transfer agent, it is used in amounts ranging from about 5 to about 70 parts per 100 parts of the terpolymer, with a preferred range of about 25 to about 35 parts per 100 parts terpolymer.

Once the monomers have reacted, the isopropyl alcohol is distilled off and the pH, % solids and viscosity are adjusted by known methods to yield the final product, which is immediately available for use.

Use of the Terpolymers

The terpolymers of the present invention are added to the aqueous system for which corrosion inhibiting and/or deposit activity is desired in an amount effective for the purpose. This amount will vary depending upon the particular system for which treatment is desired, (e.g., batch or continuous) and will be influenced by factors such as the treatment area, pH, temperature, water quantity and the concentrations in the water of the potential scale and deposit forming species. Further, the novel terpolymers may be used in association with other materials having different functional uses such as corrosion inhibitors, pH regulators and oxygen scavengers. In general, treatment levels range from about 1 to 500 parts terpolymer per million parts of aqueous system, with a range of about 1 to about 100 parts being more preferred and a range of about 1 to about 30 parts being most preferred. The terpolymers may be added directly into the desired water system in a fixed quantity on a continuous or batchwise basis and are pH stable over a range from about 1 to about 13.

In practice, the terpolymers are particularly effective against the formation of calcium phosphate and calcium carbonate scales. However, it is expected that the terpolymer also produces efficacious results against the formation of other inorganic scales such as calcium sulfate, barium sulfate and other barium scales, iron carbonate and magnesium scales such as magnesium silicates and magnesium carbonates. The terpolymers also function as a dispersant for metallic oxides such as FeO and $TiO_2$.

The terpolymers of the present invention may be used in association with any type of aqueous system. For example, they may be used in boiler and cooling water and in scrubber systems where corrosion and/or the formation of scale deposits poses problems. Other environments in which the terpolymers may be used include heat distribution type sea water desalting apparatus, in oil field services to remove scales from pipe walls, in mining applications such as gold heap leaching, in reverse osmosis systems and as a dispersant in the pulp and paper processing industries. They also could be used as mineral beneficiation aids such as in iron ore, phosphate and potash recovery.

In addition to being used alone, as discussed above, the terpolymers of the present invention may be used in combination with one or more other agents which provide other functional uses such as corrosion inhibition, oxygen scavenging, pH regulation and the like to yield a final multifuncional formulation which may then be added to aqueous systems. Examples of such agents include phosphorous containing materials, zinc and nickel salts, chromate compounds, azoles, thiazoles, molybdates, tungstates, nitrites, borates, silicates, oxycarboxylic acids, amino acids, catechols, aliphatic amino surface active agents, benzotriazoles and mercaptobenzothiazoles.

Other agents include lignin derivatives tannic acids, starch, polyacrylic soda, polyacrylic amides, and metal ion sequestering agents such as polyamines, and polyaminocarboxylic acids. A detailed description of such additives is set forth in greater detail in U.S. Pat. No. 4,659,481. To the extent necessary, this patent is incorporated by reference.

When used in combination with one or more of the agents of either of the two preceding paragraphs to produce a multifunctional formulation, the terpolymer is present in an amount of between about 1 and about 60 parts per 100 parts of the final formulation, with a preferred range of between about 1 and about 20 parts. For example a final formulation useful for treating cooling water towers may include the following components in the following weight ranges:

| | |
|---|---|
| Water | 55 to 65 parts |
| Potassium Hydroxide (45%) | 20 to 30 parts |
| Toluene triazole | 1 to 6 parts |
| 1-hydroxyethylidene-1,1-diphosphonic acid (60%) | 5 to 15 parts |
| Sodium hexametaphosphate | 1 to 5 parts |
| Inventive terpolymer | 1 to 10 parts |

The invention is described in greater detail by the following nonlimiting examples.

EXAMPLE 1

5 parts by mole (81.2 parts by weight of a 40% solution) of 1-propane sulfonic acid, 2-hydroxy-3-(2-propenyloxy)-mono sodium salt (Unit C) is provided in a reactor vessel containing 118.4 parts by weight water (Component D) and 70 parts by weight isopropyl alcohol (Component E). This mixture is heated to reflux. The reflux temperature is about 86° C. 90 parts by mole (192.8 parts by weight) of acrylic acid (Unit A) and 5 parts by mole (12.8 parts by weight) of vinyl acetate (Unit B) are mixed together and metered into the reactor vessel with about 7.47 parts by weight of sodium persulfate (Component F) in 25 parts water over a two hour period while the reactor mixture continues to reflux. The mixture is held at reflux for about 30 minutes, 0.1 parts of sodium persulfate in 2.5 parts water are added and the mixture is again held at reflux for 30 minutes. The isopropyl alcohol is then distilled off. The pH of the resulting material is adjusted by adding NaOH, and the viscosity and solids content are adjusted by adding water. Viscosity of the terpolymer is measured by the LVT method (#3, 60 rpm), the percent solids is measured by sampling the mixture in a convection oven at 150° C. for one hour and the molecular weight of the terpolymer is measured by size extrusion chromatography. The results and amounts of reactants used are provided in Table 1. (Please note that the amounts of Components D, E and F are per 100 parts by weight combined units A, B and C and that the amounts of units A, B and C are listed by mole percent). The functional properties are also shown in Table 1, where % sol represents the percentage of solids, where BV represents the viscosity in centipoise and where MW represents the molecular weight in daltons.

EXAMPLES 2-66

The procedure of Example 1 is repeated using the amounts of units A, B and C and components D, E and F as shown in Table 1. The functional properties for these terpolymers is also shown in Table 1. (Please note that the amounts of Components D, E and F are per 100 parts by weight combined units A, B and C and that the amounts of units A, B and C are listed by mole percent.)

COMPARATIVE EXAMPLES 1-6

To produce the preferred embodiments according to U.S. Pat. No. 4,711,725, the synthesis procedures of Example 1 are used wherein Monomer A is acrylic acid, Monomer B is hydroxypropyl acrylate for Comparative Examples 1, 2, 3 and 4, Monomer B is vinyl acetate for Comparative Examples 5 and 6, and Monomer C is 2-acrylamido-2-methylpropane sulfonic acid. For Comparative Examples 1, 3 and 5, t-buytlhydroperoxide is Component F and for Comparative Examples 2,4 and 6, sodium persulfate is Component F. The properties of these comparative terpolymers are set forth in Table 1. For Comparative Examples 1-6, in Table 1 the amounts of Monomers A, B, and C are listed in parts by weight.

TABLE 1

| Ex. | A | B | C | D | E | F | % sol | BV | MW |
|---|---|---|---|---|---|---|---|---|---|
| 1 | 90 | 5 | 5 | 80.7 | 29.4 | 3.1 | 51.2 | 1540 | * |
| 2 | 90 | 7.5 | 2.5 | 84.2 | 30.6 | 3.1 | 53.0 | 3000 | * |
| 3 | 90 | 2.5 | 7.5 | 77.5 | 28.3 | 3.1 | 52.7 | 2200 | * |
| 4 | 70 | 15 | 15 | 67.3 | 24.5 | 3.3 | 54.3 | 2200 | * |
| 5 | 70 | 25 | 5 | 78.0 | 28.4 | 3.1 | 49.6 | 1040 | * |
| 6 | 70 | 5 | 25 | 82.5 | 21.5 | 3.4 | 56.8 | 2240 | * |
| 7 | 60 | 20 | 20 | 71.0 | 22.6 | 3.3 | 55.2 | 2000 | * |
| 8 | 60 | 30 | 10 | 71.1 | 25.9 | 3.2 | 46.7 | 1100 | * |
| 9 | 60 | 10 | 30 | 92.3 | 20.1 | 3.9 | 50.0 | 440 | * |
| 10 | 60 | 35 | 5 | 76.6 | 27.9 | 3.1 | 51.9 | 1280 | * |
| 11 | 60 | 5 | 35 | 100.6 | 19.0 | 3.5 | 53.7 | 640 | * |
| 12 | 50 | 25 | 25 | 80.5 | 21.0 | 3.4 | 60.0 | 3280 | * |
| 13 | 50 | 45 | 5 | 75.4 | 27.5 | 3.2 | 48.3 | 300 | * |
| 14 | 50 | 5 | 45 | 113.6 | 17.0 | 3.6 | 51.4 | 200 | * |
| 15 | 50 | 35 | 15 | 65.4 | 23.8 | 3.3 | 57.2 | 5400 | * |
| 16 | 50 | 15 | 35 | 99.5 | 18.8 | 3.4 | 55.6 | 660 | * |
| 17 | 84.2 | 5.3 | 10.5 | 77.2 | 28.1 | 3.1 | 55.7 | 3800 | 23,200 |
| 18 | 76.2 | 14.3 | 9.5 | 70.0 | 25.5 | 3.1 | 55.8 | 3080 | 22,400 |
| 19 | 88.9 | 5.6 | 5.6 | 88.7 | 32.3 | 3.1 | 59.6 | 6000 | 17,400 |
| 20 | 84.2 | 10.5 | 5.3 | 83.7 | 30.5 | 3.4 | 59.3 | 6800 | 29,400 |
| 21 | 76.2 | 9.5 | 14.3 | 65.3 | 23.8 | 3.1 | 62.4 | 12000 | 28,100 |
| 22 | 72.7 | 13.6 | 13.6 | 62.6 | 22.8 | 3.1 | 56.4 | 3840 | 26,600 |

TABLE 1-continued

| Ex. | A | B | C | D | E | F | % sol | BV | MW |
|---|---|---|---|---|---|---|---|---|---|
| 23 | 76.2 | 4.8 | 19.0 | 71.5 | 22.3 | 3.1 | 59.7 | 6200 | * |
| 24 | 72.7 | 9.1 | 18.2 | 68.7 | 21.4 | 3.1 | 58.7 | 4400 | 25,300 |
| 25 | 69.6 | 13.0 | 17.4 | 66.1 | 20.6 | 3.1 | 61.1 | 7300 | 15,000 |
| 26 | 87.6 | 6.3 | 6.3 | 98.4 | 27.9 | 3.3 | 51.8 | 800 | 18,600 |
| 27 | 82.4 | 5.9 | 11.8 | 84.4 | 30.7 | 3.3 | 58.9 | 3400 | 22,200 |
| 28 | 77.8 | 5.6 | 16.7 | 74.7 | 26.9 | 3.3 | 58.8 | 4600 | 23,400 |
| 29 | 82.4 | 11.8 | 5.9 | 92.3 | 33.6 | 3.3 | 52.8 | 1120 | 18,500 |
| 30 | 77.7 | 11.1 | 11.1 | 79.9 | 29.1 | 3.3 | 56.5 | 3220 | 23,500 |
| 31 | 73.7 | 10.5 | 15.8 | 70.4 | 25.7 | 3.3 | 56.9 | 3180 | 25,700 |
| 32 | 77.5 | 16.7 | 5.6 | 87.0 | 31.7 | 3.3 | 56.4 | 3760 | 17,600 |
| 33 | 73.7 | 15.8 | 10.5 | 75.9 | 27.6 | 3.3 | 55.3 | 3400 | 20,700 |
| 34 | 73.7 | 5.3 | 21.0 | 75.1 | 23.9 | 3.3 | 59.1 | 3480 | 22,900 |
| 35 | 70 | 10 | 20 | 72.0 | 22.9 | 3.3 | 59.1 | 5850 | 27,100 |
| 36 | 66.7 | 14.3 | 19.0 | 69.0 | 22.0 | 3.3 | 55.4 | 3340 | 26,100 |
| 37 | 85.7 | 7.1 | 7.1 | 110.5 | 40.3 | 3.3 | 50.8 | 1100 | 18,600 |
| 38 | 80 | 13.3 | 6.7 | 102.9 | 37.5 | 3.3 | 55.6 | 2560 | 17,000 |
| 39 | 75 | 18.8 | 6.2 | 96.3 | 35.1 | 3.3 | 60.2 | 4500 | 14,700 |
| 40 | 80 | 6.7 | 13.3 | 93.2 | 33.9 | 3.3 | 60.8 | 3780 | 18,600 |
| 41 | 75 | 12.5 | 12.5 | 87.7 | 32.0 | 3.3 | 60.7 | 5500 | 22,400 |
| 42 | 70.6 | 17.6 | 11.8 | 82.9 | 30.2 | 3.3 | 53.4 | 2200 | 25,900 |
| 43 | 75 | 6.2 | 18.8 | 80.6 | 29.3 | 3.3 | 65.5 | 11000 | 21,400 |
| 44 | 70.6 | 11.8 | 17.6 | 76.5 | 27.8 | 3.3 | 59.1 | 4900 | 21,400 |
| 45 | 66.7 | 16.7 | 16.7 | 72.7 | 26.5 | 3.3 | 52.1 | 950 | 21,700 |
| 46 | 70.6 | 5.9 | 23.5 | 81.0 | 25.8 | 3.3 | 58.3 | 2280 | 19,300 |
| 47 | 66.7 | 11.1 | 22.2 | 79.2 | 24.6 | 3.3 | 64.4 | 7100 | 23,500 |
| 48 | 63.2 | 15.8 | 21.0 | 75.8 | 23.6 | 3.3 | 61.2 | 4500 | 24,600 |
| 49 | 85.7 | 9.5 | 4.8 | 80.7 | 29.4 | 3.4 | 61.8 | 5750 | 17,000 |
| 50 | 81.8 | 13.6 | 4.5 | 72.9 | 26.5 | 3.3 | 62.4 | 6100 | 16,700 |
| 51 | 85.7 | 4.8 | 9.5 | 71.1 | 25.9 | 3.3 | 61.4 | 4750 | 19,000 |
| 52 | 81.8 | 9.1 | 9.1 | 67.8 | 24.7 | 3.3 | 61.0 | 5100 | 19,000 |
| 53 | 78.2 | 13.0 | 8.7 | 66.6 | 23.6 | 3.3 | 62.2 | 6350 | 20,600 |
| 54 | 81.8 | 4.5 | 13.6 | 65.1 | 23.1 | 3.3 | 63.9 | 8550 | 21,800 |
| 55 | 78.2 | 8.7 | 13.0 | 62.5 | 22.2 | 3.3 | 66.9 | 18500 | 23,600 |
| 56 | 75 | 12.5 | 12.5 | 60.0 | 21.3 | 3.3 | 59.5 | 8800 | 22,500 |
| 57 | 80 | 15 | 5 | 79.4 | 28.9 | 3.3 | 60.1 | 4350 | 19,400 |
| 58 | 78.3 | 4.3 | 17.4 | 67.0 | 20.8 | 3.3 | 60.6 | 5750 | 25,000 |
| 59 | 75 | 8.3 | 16.6 | 64.6 | 20.0 | 3.3 | 60.2 | 4700 | 24,900 |
| 60 | 72 | 12 | 16 | 62.3 | 19.4 | 3.3 | 59.5 | 4300 | 25,600 |
| 61 | 80 | 6.7 | 13.3 | 93.2 | 56.0 | 3.3 | 64.6 | 6600 | 16,400 |
| 62 | 70.6 | 11.8 | 18.8 | 76.5 | 56.0 | 3.3 | 62.0 | 3100 | 15,530 |
| 63 | 87.6 | 6.3 | 6.3 | 98.4 | 55.8 | 3.3 | 60.7 | 3000 | 13,657 |
| 64 | 73.7 | 15.8 | 10.5 | 75.9 | 56.0 | 3.3 | 66.4 | 11300 | 13,740 |
| 65 | 80 | 15 | 5 | 79.3 | 56.0 | 3.2 | 65.8 | 8350 | 12,070 |
| 66 | 84.2 | 5.3 | 10.5 | 77.2 | 56.2 | 3.2 | 70.1 | 24500 | 13,800 |
| Comp. 1 | 57 | 20 | 23 | 250.0 | — | 52.0 | 25.1 | 420 | 48,600 |
| Comp. 2 | 57 | 20 | 23 | 79.0 | 28.9 | 3.2 | 50.0 | 320 | 11,500 |
| Comp. 3 | 47 | 30 | 23 | 250.0 | — | 50.0 | 25.0 | 390 | 44,200 |
| Comp. 4 | 47 | 30 | 23 | 79.0 | 28.9 | 3.2 | 50.0 | 290 | 8,980 |
| Comp. 5 | 57 | 20 | 23 | 250.0 | — | 50.0 | 24.6 | 440 | 46,100 |
| Comp. 6 | 57 | 20 | 23 | 79.0 | 28.9 | 3.2 | 50.0 | 740 | 26,700 |

*NOT TESTED

EXAMPLES 67–70

The procedure of Example 1 is repeated except that all of the starting monomers are simultaneously metered into the reaction vessel, which contains a refluxing mixture of water and isopropyl alcohol. The amounts of the components used (normalized to 100 parts by weight of units A, B and C) and % solids, viscosity and pH of the resulting materials are shown in Table 2. For examples 67–68, A is acrylic acid and for Examples 69–70, A is methacrylic acid. (Please note that the amounts of Components D, E and F are per 100 parts by weight combined units A, B and C and that the amounts of units A, B and C are listed by mole percent)

COMPARATIVE EXAMPLES 7–13

The procedure of Examples 67–70 is repeated except that no vinyl acetate is added to the mixture. The amounts of the components used (normalized to 100 parts by weight of units A, B and C) and % solids, viscosity and pH of the resulting materials are shown in Table 2. For Comparative Examples 7–10, A is acrylic acid and for Comparative Examples 11–13, A is methacrylic acid. (Please note that the amounts of Components D, E and F are per 100 parts by weight combined units A, B and C and that the amounts of units A, B and C are listed by mole percent)

TABLE 2

| Ex. | A | B | C | D | E | F | % sol | BV | pH |
|---|---|---|---|---|---|---|---|---|---|
| Comp. 7 | 95 | — | 5 | 141.3 | 29.6 | 3.0 | 45.0 | 860 | 4.47 |
| Comp. 8 | 90 | — | 10 | 130.0 | 27.2 | 3.1 | 45.0 | 780 | 4.28 |
| Comp. 9 | 80 | — | 20 | 112.7 | 23.2 | 3.0 | 45.0 | 216 | 4.28 |
| Comp. 10 | 70 | — | 30 | 99.8 | 20.3 | 3.0 | 45.0 | 130 | 4.30 |
| 67 | 85 | 5 | 10 | 74.9 | 26.9 | 3.1 | 45.0 | 340 | 2.25 |
| 68 | 80 | 10 | 10 | 74.5 | 26.7 | 3.1 | 45.0 | 320 | 2.35 |
| Comp. 11 | 95 | — | 5 | 134.1 | 175.0 | 3.2 | 39.3 | 1,000,000+ | 4.10 |
| Comp. 12 | 90 | — | 10 | 124.9 | 122.5 | 3.2 | 39.9 | 400,000 | 4.36 |
| Comp. 13 | 80 | — | 20 | 73.6 | 144.2 | 3.2 | 44.9 | 286,000 | 4.03 |
| 69 | 85 | 5 | 10 | 125.0 | 122.7 | 3.2 | 41.0 | 840,000 | 2.25 |
| 70 | 80 | 10 | 10 | 125.0 | 163.6 | 3.2 | 39.7 | 170,000 | 2.31 |

SCALE INHIBITION TESTING

(A) Test Procedures

To test the usefulness of the inventive and comparison compounds as scale inhibitors, a number of quantitative tests are performed.

(1) Calcium phosphate inhibition: A solution is prepared by adding the following to a 4 ounce jar: (a) 50 ml of 12 ppm $Na_2HPO_4^{3-}$ as $PO_4^{3-}$; (b) 50 ml of 500 ppm $CaCl_2$ as $CaCO_3$ (with 5mg/l $Fe^{3+}$ added); and (c) an amount of the Example or Comparative Example composition in parts per million. Each sample is pH adjusted to 8.5 by using NaOH. A lid is placed on the sample jars and they are stored in a 70° C. vibrating glycerine temperature bath for 17 hours. The samples are removed from the oven and they are filtered through a 0.22 micron millipore filter. The final concentrations are as follows: 250 ppm $Ca^{2+}$, 6 ppm $PO_4^{3-}$, 2.5 ppm $Fe^{3+}$. The percentage of phosphate inhibition for each sample is shown in Table 3. A commercial product, Calgon TRC 233 was tested at a 10 ppm dosage level. Its inhibition value is 92.5%. Tests are repeated using concentrations of $PO_4^{3-}$ of 12 ppm and 24 ppm. These results are also shown in Table 3.

TABLE 3

| Example | Polymer amt | 6 ppm $PO_4^3$ | 12 ppm $PO_4^3$ | 24 ppm $PO_4^3$ |
|---|---|---|---|---|
| 17 | 10 | 97.5 | 67.5 | 63.1 |
| 18 | 10 | 97.0 | * | * |
| 19 | 10 | 92.5 | * | * |
| 20 | 10 | 90.0 | * | * |
| 21 | 10 | 91.3 | * | * |
| 22 | 10 | 87.5 | * | * |
| 23 | 10 | 94.3 | * | * |
| 24 | 10 | 96.8 | * | * |
| 25 | 10 | 82.8 | * | * |
| 26 | 10 | 95.0 | 67.5 | 57.5 |
| 27 | 10 | 92.5 | * | * |
| 28 | 10 | 91.3 | * | * |
| 29 | 10 | 93.8 | * | * |
| 30 | 10 | 91.3 | * | * |
| 31 | 10 | 91.3 | * | * |
| 32 | 10 | 92.5 | * | * |
| 33 | 10 | 93.1 | 61.3 | 48.8 |
| 34 | 10 | 86.3 | * | * |
| 35 | 10 | 88.8 | * | * |
| 36 | 10 | 84.4 | * | * |
| 37 | 10 | 88.8 | * | * |
| 38 | 10 | 92.5 | * | * |
| 39 | 10 | 92.5 | * | * |
| 40 | 10 | 97.3 | 68.8 | 65.6 |
| 41 | 10 | 93.6 | * | * |
| 42 | 10 | 93.3 | * | * |
| 43 | 10 | 92.5 | * | * |
| 44 | 10 | 93.6 | 68.8 | 63.8 |
| 45 | 10 | 93.3 | * | * |
| 46 | 10 | 93.6 | * | * |
| 47 | 10 | 85 | * | * |
| 48 | 10 | 80 | * | * |
| 49 | 10 | 72.5 | * | * |
| 50 | 10 | 78.8 | * | * |
| 51 | 10 | 78.9 | * | * |
| 52 | 10 | 79.8 | * | * |
| 53 | 10 | 78.4 | * | * |
| 54 | 10 | 79.3 | * | * |
| 55 | 10 | 84.0 | * | * |
| 56 | 10 | 78.6 | * | * |
| 57 | 10 | 97.5 | 68.8 | 63.8 |
| 58 | 10 | 84.0 | * | * |
| 59 | 10 | 80.0 | * | * |
| 60 | 10 | 83.5 | * | * |
| 61 | 10 | 86.0 | 61.2 | 29.6 |
| 62 | 10 | 88.5 | 60.0 | 30.5 |
| 63 | 10 | 83.0 | 52.4 | 24.8 |
| 64 | 10 | 83.4 | 54.8 | 27.5 |
| 65 | 10 | 91.5 | 67.8 | 27.0 |
| 66 | 10 | 89.1 | 66.4 | 31.8 |
| 40 | 20 | 100 | 90.3 | 86.2 |
| 44 | 20 | 100 | 91.4 | 83.0 |
| 26 | 20 | 100 | 92.3 | 86.7 |
| 33 | 20 | 100 | 90.6 | 79.8 |
| 57 | 20 | 100 | 94.2 | 85.1 |
| 17 | 20 | 100 | 91.2 | 84.0 |
| 61 | 20 | 89.6 | 64.5 | 31.4 |
| 62 | 20 | 89.3 | 63.4 | 32.6 |
| 63 | 20 | 85.7 | 56.7 | 27.1 |
| 64 | 20 | 85.0 | 56.8 | 30.1 |
| 65 | 20 | 93.1 | 66.1 | 32.1 |
| 66 | 20 | 91.3 | 67.6 | 33.1 |
| Comp Ex 1 | 20 | 52.3 | * | * |
| Comp Ex 2 | 20 | 55.1 | * | * |
| Comp Ex 3 | 20 | 50.0 | * | * |
| Comp Ex 4 | 20 | 56.1 | * | * |
| Comp Ex 5 | 20 | 52.1 | * | * |
| Comp Ex 6 | 20 | 52.3 | * | * |

Another test solution is prepared by utilizing the following procedure: A solution is prepared by adding the following to a 4 ounce jar: (a) 50 ml of 12 ppm $Na_2HPO_4^{3-}$ as $PO_4^{3-}$; (b) 50 ml of 2500 ppm $CaCl_2$ as $CaCO_3$; and (c) an amount in parts per million of the Example or Comparative Example composition. Each sample is pH adjusted by 8.5 by using NaOH. A lid is placed on the sample jars and they are stored in a 70° C. vibrating glycerine temperature bath for 24 hours. The samples are removed from the oven and they are filtered through a 0.22 micron millipore filter. The final concentrations are as follows: 1250 ppm $Ca^{2+}$, 6 ppm $PO_4^{3-}$. The percentage of phosphate inhibition for each sample is shown in Table 4. Tests are repeated using concentrations of $PO_4^{3-}$ of 12 ppm and 24 ppm. These results are also shown in Table 4.

TABLE 4

| Example | Polymer amt | 6 ppm $PO_4^3$ | 12 ppm $PO_4^3$ | 24 ppm $PO_4^3$ |
|---|---|---|---|---|
| 40 | 10 | 95.3 | 77.7 | 70.4 |
| 44 | 10 | 96.1 | 78.1 | 69.9 |
| 26 | 10 | 95.6 | 74.3 | 69.6 |
| 33 | 10 | 94.8 | 72.9 | 60.2 |
| 57 | 10 | 98.0 | 77.7 | 70.1 |
| 17 | 10 | 97.2 | 76.5 | 63.2 |
| 61 | 10 | 62.0 | 20.1 | 11.7 |
| 62 | 10 | 63.3 | 19.1 | 11.7 |
| 63 | 10 | 60.3 | 14.1 | — |
| 64 | 10 | 62.1 | 16.9 | — |
| 65 | 10 | 77.8 | 54.4 | 16.3 |
| 66 | 10 | 74.1 | 18.3 | 10.6 |
| 40 | 20 | 100 | 92.0 | 88.2 |
| 44 | 20 | 100 | 93.1 | 86.2 |
| 26 | 20 | 100 | 92.3 | 86.9 |
| 33 | 20 | 100 | 90.3 | 80.1 |
| 57 | 20 | 100 | 95.0 | 90.1 |
| 17 | 20 | 100 | 93.7 | 86.0 |
| 61 | 20 | 68.2 | 28.2 | 17.6 |
| 62 | 20 | 67.7 | 29.5 | 16.1 |
| 63 | 20 | 62.0 | 21.4 | 15.4 |
| 64 | 20 | 67.1 | 26.9 | 9.8 |
| 65 | 20 | 79.4 | 56.2 | 18.6 |
| 66 | 20 | 76.8 | 26.1 | 19.7 |
| Comp. Ex. 1 | 20 | 31.5 | * | * |
| Comp. Ex. 2 | 20 | 32.2 | * | * |
| Comp. Ex. 3 | 20 | 31.5 | * | * |
| Comp. Ex. 4 | 20 | 34.8 | * | * |
| Comp. Ex. 5 | 20 | 32.2 | * | * |
| Comp. Ex. 6 | 20 | 31.6 | * | * |

*NOT TESTED (2) Calcium Carbonate Inhibition: A static calcium carbonate inhibition test is performed by using NACE (National Association of Corrosion Engineers) Standard Procedure TM-03-74. Two experimental samples (Example 57 and Example 17), Comparative Example 5 and a commercial product, Calgon TRC 233 are tested at polymer dosages of 1, 4, 7, 10, 14, 17 and 20 ppm. The percent inhibition for each of the tests is shown in Table 5.

TABLE 5

| Example | 1 | 4 | 7 | 10 | 14 | 17 | 20 |
|---|---|---|---|---|---|---|---|
| 57 | 10.0 | 15.6 | 17.0 | 26.6 | 28.3 | 30.2 | 33.2 |
| 17 | 6.3 | 13.9 | 16.2 | 19.9 | 25.5 | 29.0 | 34.2 |
| Comp. Ex. 5 | 6.8 | 16.1 | 18.3 | 23.3 | 23.7 | 25.0 | 26.4 |
| Calgon TRC 233 | 6.2 | 9.5 | 11.8 | 11.9 | 12.4 | 13.0 | 18.0 |

A dynamic calcium carbonate inhibition test is performed by utilizing the following titration method:
(i) An amount of the polymer to be tested is added to water in a 1000 ml jacketed beaker to make 400 g of solution.
(ii) While maintaining the solution at a constant temperature by using circulating water, a pH electrode and a thermometer are inserted into the beaker. Two 50 ml burets are filled with 0.05M $Na_2CO_3$ and 0.05M $CaCl_2$ solutions and are connected to a feed pump so that they can be added to solution at identical rates.
(iii) A line from a pH controlled titrator filled with 0.05M HCl is inserted into the jacketed beaker above the solution.
(iv) When the desired temperature is achieved, the pH is adjusted to a desired value by using NaOH.
(v) The titration is initiated by turning on the pump and the controlled titrator.
(vi) The volumes of $Na_2CO_3$, $CaCl_2$, and HCl are recorded when the titrator stops adding HCl to the beaker.

The above procedure is repeated by using a blank which contains 400 g water and no polymer. The percent inhibition of $CaCO_3$ is calculated by subtracting the blank value (ppm $CaCO_3$) from the sample value (ppm $CaCO_3$), dividing this value by the blank value and multiplying by 100. Examples 67, 68 and 70 and Comparative Examples 7-13 were used for this test at a temperature of 50° C. and a pH of 8.5. The results for initial sample concentrations of 2.5, 5, 15, 25 and 35 ppm are listed in Table 6.

TABLE 6

| Example | 2.5 ppm | 5.0 ppm | 15.0 ppm | 25 ppm | 35 ppm |
|---|---|---|---|---|---|
| Comp. Ex. 7 | 89.5 | 92.0 | 95.3 | 105.3 | 118.8 |
| Comp. Ex. 8 | 38.8 | 56.3 | 105.5 | 126.1 | 148.4 |
| Comp. Ex. 9 | 71.0 | 106.1 | 110.9 | 117.3 | 131.8 |
| Comp. Ex. 10 | 60.7 | 91.3 | 102.5 | 114.8 | 119.7 |
| 67 | 56.5 | 83.5 | 97.6 | 118.1 | 151.3 |
| 68 | 64.7 | 104.8 | 124.4 | 143.6 | 164.4 |
| Comp. Ex. 11 | 57.6 | 67.1 | 106.7 | 120.2 | 163.9 |
| Comp. Ex. 12 | 54.3 | 68.5 | 115.2 | 126.4 | 167.4 |
| Comp. Ex. 13 | 93.6 | 96.9 | 105.1 | 135.5 | 158.3 |
| 70 | 39.1 | 94.6 | 111.1 | 139.9 | 146.6 |

(B) Discussion of Results

As seen from the data, the compositions of the present invention provide excellent inhibition against calcium phosphate and calcium carbonate across wide testing ranges. Further, as shown in Table 3, the terpolymers perform well in the presence of $Fe^{3+}$.

Of the terpolymers synthesized, Examples 17, 26, 33, 40, 44 and 57 yield particularly promising results, with Example 57 being particularly effective. For example, at a 6 ppm phosphate ion level with a treatment level of 20 ppm, each of these terpolymers effectively inhibit 100% of the phosphate ions. By comparison, the preferred terpolymer compositions according to U.S. Pat. No. 4,711,725 yield results in the 50–55% effectiveness range. These samples also yield results that are comparable to, if not more effective, than the results obtained when using a commercially available product, Calgon TRC 233.

The data associated with Examples 61–66 indicate that lowering the molecular weight of the resulting terpolymer does not improve results. According to the test procedures, the preferred molecular weight for the acrylic acid based terpolymers is between about 15,000 and 25,000 daltons.

With respect to the static $CaCO_3$ test, the two inventive terpolymers produce better inhibition results than the sample made according to U.S. Pat. No. 4,711,725 and the commercially available product.

With respect to the dynamic $CaCO_3$ test, the three inventive polymers produce better inhibition results than the comparative examples which are copolymers of acrylic or methacrylic acid with APHSE.

Having described the invention in detail and by reference to the preferred embodiments thereof, it will be apparent that modifications and variations are possible without departing from the scope of the appended claims.

What is claimed is:

1. A process for inhibiting the formation of inorganic scales including calcium carbonate or calcium phosphate or reducing the amount of said inorganic scales present in an aqueous system comprising the step of adding to said system an effective amount of a water soluble terpolymer consisting essentially of 50 to 90 mole percent repeating unit (I); 5 to 30 mole percent repeating unit (II); and 5 to 30 mole percent repeating unit (III):

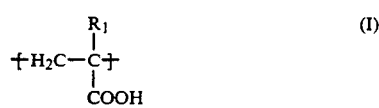

where $R_1$ is H or CH3;

where X is COCH3 or H;

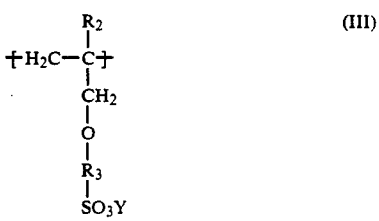

where $R_2$ is H or a $C_1$-$C_3$ alkyl group; $R_3$ is a hydroxysubstituted alkylene radical having from 1 to 6 carbon atoms; and Y is H or a water soluble metal cation.

2. The process according to claim 1 wherein the amount of the terpolymer added comprises between about 1 parts and about 500 parts per one million parts aqueous system.

3. The process according claim 2 wherein the scales further include calcium sulfate, barium sulfate or magnesium scales.

4. The process according to claim 3 wherein repeating unit (I) is derived from acrylic acid, repeating unit (II) is derived from vinyl acetate and/or vinyl alcohol, and repeating unit (III) is derived from 1-propane sulfonic acid, 2-hydroxy-3-(2-propenyl oxy)-mono sodium salt.

5. The process according to claim 4 wherein said terpolymer has a molecular weight ranging from about 15,000 to about 25,000 daltons.

6. The process according to claim 5 wherein the molar ratios of repeating unit (I)/repeating unit (II)/repeating unit (III) are selected from the following ratios: 80/15/5, 87.5/6.25/6.25, 80/6.7/13.3, 70.5/11.7/17.6, 73.6/15.8/10.5 and 84.2/5.3/10.5.

7. The process according to claim 6 wherein said terpolymer has a molar ratio of repeating unit (I)/repeating unit (II)/repeating unit (III) of 80/15/5.

8. The process according to claim 3 wherein repeating unit (I) is derived from methacrylic acid, repeating unit (II) is derived from vinyl acetate and/or vinyl alcohol, and repeating unit (III) is derived from 1-propane sulfonic acid, 2-hydroxy-3-(2-propenyl oxy)-mono sodium salt.

9. The process according to claim 1 comprising the additional step of adding one or more of the following agents to said terpolymer to provide a multifunctional formulation which is added to said aqueous system: phosphorous containing materials, zinc and nickel salts, chromate compounds, azoles, thiazoles, molybdates, tungstates, nitrites, borates, silicates, oxycarboxylic acids, amino acids, catechols, aliphatic amino surface active agents, benzotriazoles, mercaptobenzothiazoles, lignin derivatives, tannic acids, starch, polyacrylic soda, polyacrylic amides, metal ion sequestering agents and mixtures thereof.

10. The process according to claim 9 wherein the amount of terpolymer present in said formulation ranges from about 1 to about 60 parts per 100 parts of formulation added.

11. The process according to claim 10 wherein said formulation comprises the following constituents:

| | |
|---|---|
| Water | 55 to 65 parts |
| Potassium Hydroxide (45%) | 20 to 30 parts |
| Toluene triazole | 1 to 6 parts |
| 1-hydroxyethylidene-1, 1-diphosphonic acid | 5 to 15 parts |
| Sodium hexametaphosphate | 1 to 5 parts |
| Said Terpolymer | 1 to 10 parts. |

* * * * *